(12) United States Patent
Sandlin et al.

(10) Patent No.: US 6,458,875 B1
(45) Date of Patent: Oct. 1, 2002

(54) TRANSPARENT POLYURETHANE COMPOSITIONS

(75) Inventors: Stephen L. Sandlin, Long Beach; Lin Hin Hoo, Torrance; Marlowe V. Moncur, Irvine, all of CA (US)

(73) Assignee: Pilkington Aerospace Inc., Garden Grove, CA (US)

( * ) Notice: Subject to any disclaimer, the term of this patent is extended or adjusted under 35 U.S.C. 154(b) by 79 days.

(21) Appl. No.: 09/585,690

(22) Filed: Jun. 1, 2000

Related U.S. Application Data

(62) Division of application No. 09/016,452, filed on Jan. 30, 1998, now Pat. No. 6,093,451.

(51) Int. Cl.⁷ .............................. C08J 3/00; C08K 5/43; C08L 75/00
(52) U.S. Cl. ........................ 524/168; 524/589; 524/590
(58) Field of Search ................................ 524/589, 590, 524/168

(56) References Cited

U.S. PATENT DOCUMENTS

| | | |
|---|---|---|
| 4,617,325 A | 10/1986 | Knobel et al. |
| 4,618,630 A | 10/1986 | Knobel et al. |
| 4,806,571 A | 2/1989 | Knobel et al. |
| 4,912,142 A | 3/1990 | Vermeulen et al. |
| 4,914,150 A | 4/1990 | Prier |
| 4,931,486 A | 6/1990 | Myers |
| 4,939,204 A | 7/1990 | Efford |
| 5,554,474 A | 9/1996 | Vreeland et al. |
| 5,567,740 A | 10/1996 | Free |
| 5,585,038 A | 12/1996 | Kirmanen et al. |
| 5,585,040 A | 12/1996 | Kirmanen et al. |
| 5,639,847 A | 6/1997 | Chiang et al. |
| 5,723,175 A | 3/1998 | Scholz et al. ............... 427/161 |
| 5,825,526 A | 10/1998 | Bommarito et al. ......... 359/265 |
| 5,912,093 A | 6/1999 | Wen et al. .................. 429/192 |
| 5,939,188 A | 8/1999 | Moncur et al. ............. 428/332 |

*Primary Examiner*—Patrick D. Niland
(74) *Attorney, Agent, or Firm*—Sheppard, Mullin, Richter & Hampton LLP; James R. Brueggemann

(57) ABSTRACT

The present invention is embodied in a polyurethane composition suitable for coating, casting or laminating, which incorporates a prescribed additive selected to increase the composition's electrical conductivity without adversely affecting the composition's transparency and percent haze and without adversely affecting its adhesion to an underlying substrate or its environmental durability, especially with regard to humidity resistance. The prescribed additive is an ionizable metal salt of a perfluoroalkylsulfonimide, in a weight percent of 0.5 to 5.0, with the metal being an alkali metal and the preferred perfluoroalkylsulfonimide being trifluoromethanesulfonimide. The most preferred salt is lithium trifluoromethanesulfonimide. The preferred polyurethanes include both aliphatic polyetherurethanes and aliphatic polyesterurethanes. Use of the additive enhances the composition's electrical conductivity by at least about two orders of magnitude, thereby minimizing the risk of a static charge building to a point where a shock hazard is created or the polyurethane coating or laminate is damaged by a rapid discharge of electrical current. The composition is particularly useful in an aircraft window or transparency, where it can be used as a coating or laminated film overlaying a transparent conductive coating.

7 Claims, 2 Drawing Sheets

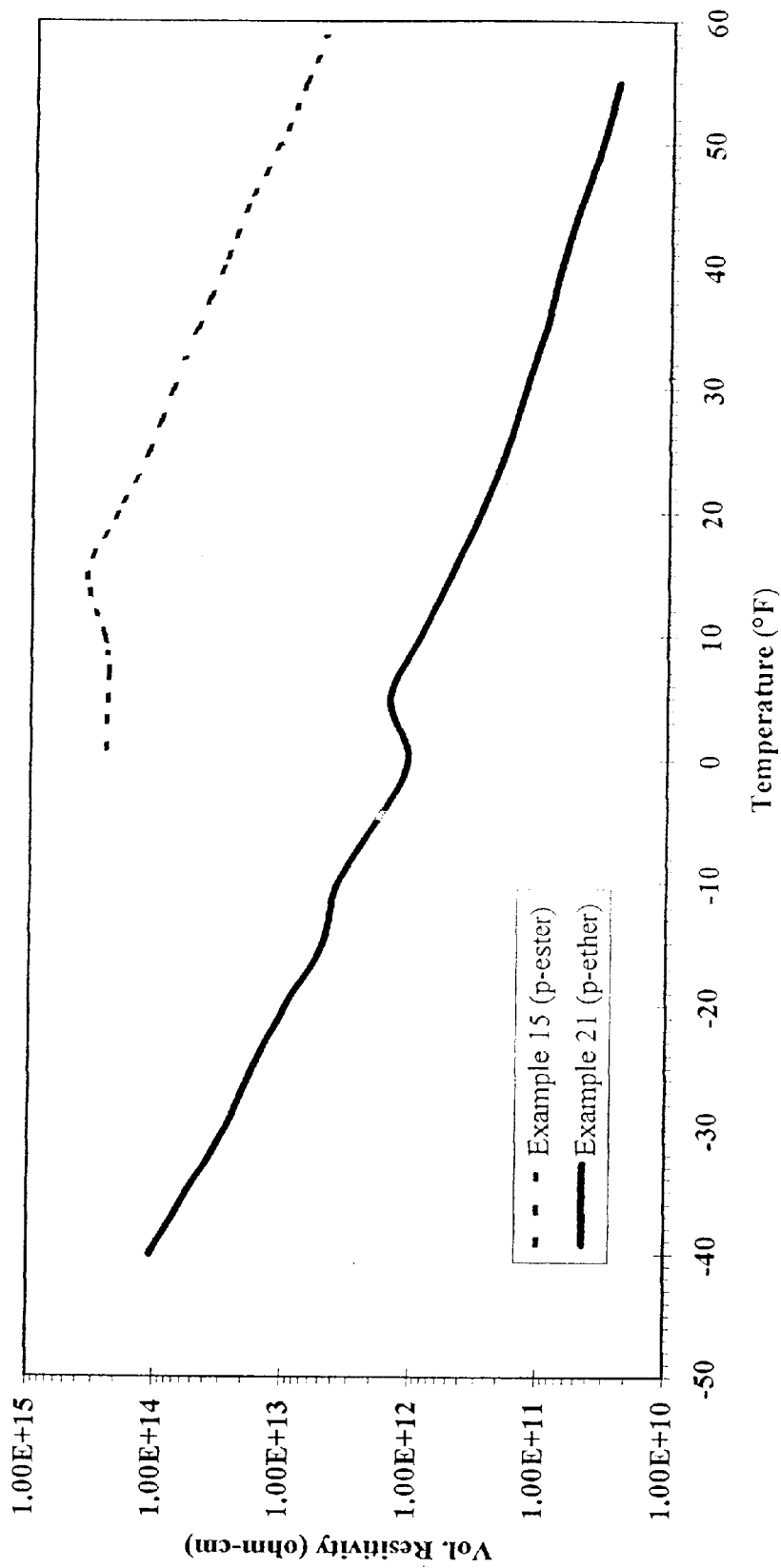
FIG 1: Volume Resistivity vs. Temperature for Modified Polyether- and Polyesterurethanes

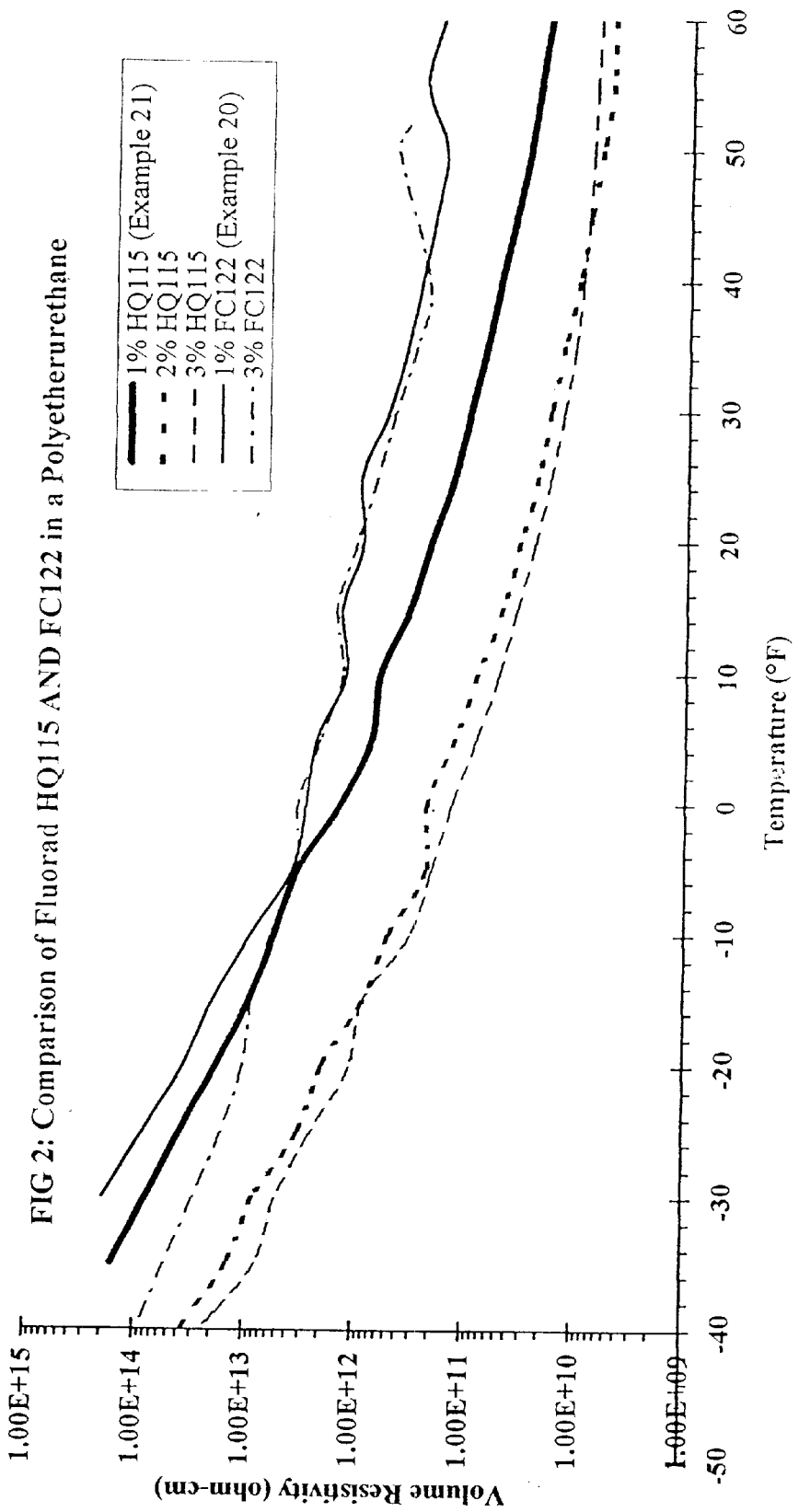

TRANSPARENT POLYURETHANE COMPOSITIONS

This is a division of application Ser. No. 09/016,452, filed Jan. 30, 1998, now U.S. Pat No. 6,093,451.

BACKGROUND OF THE INVENTION

This invention relates generally to transparent polyurethane compositions, and to coated transparencies and laminates incorporating such compositions, and more particularly to such compositions, coated transparencies, and laminates having antistatic or static dissipative properties.

Polyurethanes and other organic polymers generally are poor conductors of electricity. Consequently, these polymers cannot be used satisfactorily without modification in applications where static dissipative properties are required.

Several methods have been used in the past to modify polyurethanes so as to increase their electrical conductivity, and thereby to better dissipate a buildup of static charge. In one such method, conductive fibers or particles are incorporated into the polyurethane matrix. This method is not suitable for use with polyurethanes that are transparent, however, because the conductive filler materials render the modified polyurethane opaque.

In another method for modifying polyurethanes to increase their electrical conductivity, conductive polymers based on polyanilines are incorporated into the polyurethane matrix. Again, however, this method is not suitable for use with polyurethanes that are transparent, because the polyaniline additives form a dispersed phase that reduces the polyurethane's transparency. In addition, polyanilines generally are ineffective at increasing the modified polyurethane's conductivity when incorporated at a low concentration.

In yet another method for modifying polyurethanes to increase their electrical conductivity, hydrophilic additives such as amines and quaternary ammonium salts are used to increase the polyurethane's surface conductivity. These additives function by migrating to the polyurethane's surface, where they attract water and thereby create a conductive film. This method is not suitable for polyurethane coatings and laminates, however, because the additive also migrates to the surface of the polyurethane that interfaces with the underlying substrate, to cause a loss of adhesion. In addition, such additives can lose their effectiveness over time, because they can leach from the polyurethane under normal use conditions.

Still other methods for modifying polyurethanes to increase their electrical conductivity, usable in the past only for polyurethane foams, call for adding in ionizable metal salts coupled with an enhancer. The preferred salt cation is an alkali or alkaline earth metal ion, and the preferred anion is the conjugate base of an inorganic acid or a C2–C4 carboxylic acid. The preferred enhancers are phosphate esters and salts or esters of fatty acids.

None of these known additives for increasing the electrical conductivity of polyurethanes are considered fully satisfactory for use in polyurethanes that are transparent, and particularly in polyurethanes that are used as coatings or in laminates for aircraft windows.

In general, non-ionic additives and polyol modifiers have been found to significantly enhance electrical conductivity only if used at high levels, which can adversely affect other important properties, such as transparency and mechanical strength. Ionic additives, including quarternary ammonium salts and ionizable metal salts, generally are more effective in enhancing electrical conductivity. The most effective known additives of this kind are ionizable metal salts of perfluoroalkylsulfonates. However, none of these ionic additives are considered fully satisfactory for use in transparent polyurethanes used as coatings or in laminates, because with aging they can cause a loss of transparency and a loss of adhesion.

It should therefore be appreciated that there is a need for an improved polyurethane composition, and for coated transparencies and laminates incorporating such a composition, that incorporates an additive for enhancing electrical conductivity without adversely affecting the composition's transparency and without adversely affecting the composition's adhesion to an underlying substrate. The present invention fulfills this need and provides further related advantages.

SUMMARY OF THE INVENTION

The present invention is embodied in an improved polyurethane composition, and in coated transparencies and laminates (e.g., aircraft windows) incorporating such a composition, the composition incorporating a prescribed additive for enhancing electrical conductivity without adversely affecting the composition's transparency and or adhesion to an underlying substrate. More particularly, the polyurethane composition incorporates 0.5 to 5.0 weight percent of an ionizable salt of a perfluoroalkylsulfonimide. The metal preferably is an alkali metal, and the perfluoroalkylsulfonimide preferably is trifluoromethanesulfonimide. The most preferred ionizable salt is lithium trifluoromethanesulfonimide, in a weight percent in the range of 1.0 to 3.0. This enhances the composition's electrical conductivity by at least about two orders of magnitude.

The ionizable salt of a perfluoroalkylsulfonimide is suitable for use as an additive in both polyesterurethanes and polyetherurethanes. The preferred polyurethane composition incorporates aliphatic polyetherurethane, with which the prescribed additive can reduce electrical volume resistivity to values of less than about $1 \times 10^{11}$ ohm-cm.

One important use of the polyurethane composition of the invention is as a transparent coating or as part of a transparent laminate. When used as a transparent coating, the composition has particular utility when coated onto a transparent, conductive metal coating, e.g., indium tin oxide (ITO), gold, and gold/metal oxide stacks, overlaying a transparent substrate. The enhanced electrical conductivity minimizes the risk that static charge can build to a point where a shock hazard is created or the polyurethane coating is damaged by a rapid discharge of electrical current.

Other features and advantages of the invention should become apparent from the following description of the preferred embodiments, taken in conjunction with the accompanying drawings, which illustrate, by way of example, the principles of the invention.

BRIEF DESCRIPTION OF THE DRAWINGS

FIG. 1 is a graph depicting the relationship between volume resistivity and temperature, for the polyurethane compositions of Examples 15 and 21.

FIG. 2 is a graph depicting the relationship between volume resistivity and temperature, for the polyetherurethane compositions of Examples 20 and 21.

DESCRIPTION OF THE PREFERRED EMBODIMENTS

The present invention is embodied in a polyurethane composition that incorporates a prescribed additive selected to increase the composition's electrical conductivity (i.e., decrease its volume resistivity) without adversely affecting the composition's transparency and environmental durability, or the transparency's adhesion to an underlying substrate. The prescribed additive is an ionizable metal salt of a perfluoroalkylsulfonimide, with the metal being an alkali metal and the preferred perfluoroalkylsulfonimide being trifluoromethanesulfonimide. The most preferred salt is lithium trifluoromethanesulfonimide. The preferred polyurethanes include both aliphatic polyetherurethanes and aliphatic polyesterurethanes.

The modified polyurethane composition is ideal for use as a coating for a transparent substrate or as part of a transparent laminate. The composition's enhanced conductivity minimizes the possibility of the buildup of static charge where a shock hazard is created or damage to the polyurethane can occur.

The modified polyurethane composition of the invention can best be understood by reference to the following examples.

EXAMPLES 1–15

Preparation of Transparent Polyesterurethanes Incorporating Antistatic Additives A transparent aliphatic polyesterurethane mix, suitable for coating, laminating or casting, was prepared from the formulation set forth in Table 1.

TABLE 1

Aliphatic Polyesterurethane Formulation

| Raw Material | Description | Parts (wt.) |
|---|---|---|
| Desmodur W[1] | Bis(4-isocyanato-cyclohexyl)methane | 38.62 |
| Tone 305[2] | Polycaprolactone triol | 43.88 |
| Tone 210[2] | Polycaprolactone diol | 17.20 |
| Butanediol | Chain extender | 0.36 |
| Tinuvin 328[3] | UV stabilizer | 0.50 |
| Irganox 1010[3] | Antioxidant | 0.50 |

[1]Available from Bayer
[2]Available from Union Carbide
[3]Available from Ciba Geigy After a homogeneous solution of the specified polyesterurethane mix was prepared, with the solution temperature at 100° F., 30 ppm dibutyl tin dilaurate catalyst and an antistatic additive were added. Fifteen such solutions were prepared, using the antistatic additives identified in Table 2. The resulting solutions were then cast onto glass or another suitable surface with a transparent conductive coating and cured at 120° F. for 12 hours, followed by 180° F. for 24 hours. The cast films were about 0.025 inches thick. After curing, the volume resistivity of each of the 15 formulations was measured (at 60° F.) using the method described in ASTM D-257. The additives, their weight percentage, and the resulting electrical resistivity measurements are presented in Table 2.

TABLE 2

Antistatic Additives in Polyesterurethane

| Ex. | Additive | Type | Wt. % | Vol. Res. (ohm-cm) |
|---|---|---|---|---|
| 1 | none | — | 0 | >$10^{14}$ |
| 2 | Cyagard SN[1] | Ammonium salt | 1.0 | $1.3 \times 10^{13}$ |

TABLE 2-continued

Antistatic Additives in Polyesterurethane

| Ex. | Additive | Type | Wt. % | Vol. Res. (ohm-cm) |
|---|---|---|---|---|
| 3 | Markstat AL 12[2] | Ammonium salt | 1.0 | $5.0 \times 10^{13}$ |
| 4 | Markstat AL 12[2] | Ammonium salt | 4.0 | $1.3 \times 10^{12}$ |
| 5 | Antistaticum RC100[3] | Polyether polyol | 1.0 | >$10^{14}$ |
| 6 | Antistaticum RC100[3] | Polyether polyol | 10.0 | $4.8 \times 10^{12}$ |
| 7 | Stature II[4] | Polyether polyol | 1.0 | >$10^{14}$ |
| 8 | Stature II[4] | Polyether polyol | 10.0 | $9.2 \times 10^{12}$ |
| 9 | Larostat 377[5] | Ammonium salt | 1.0 | $1.5 \times 10^{13}$ |
| 10 | KenStat KSMZ100[6] | Zirconate salt | 1.0 | $1.9 \times 10^{13}$ |
| 11 | Atmer 154[7] | Fatty acid ester | 1.0 | >$10^{14}$ |
| 12 | Atmer 154[7] | Fatty acid ester | 10.0 | $1.5 \times 10^{13}$ |
| 13 | Versicon[8] | Polyaniline | 1.0 | >$10^{14}$ |
| 14 | Fluorad FC122[9] | Lithium trifluoromethane sulfonate | 1.0 | $4.5 \times 10^{12}$ |
| 15 | Fluorad HQ115[9] | Lithium trifluoromethanesulfonimide | 1.0 | $3.1 \times 10^{12}$ |

[1]Available from Cytec
[2]Available from Witco
[3]Available from Bayer
[4]Available from Dow
[5]Available from PPG
[6]Available from Kenrich
[7]Available from ICI
[8]Available from Allied Signal
[9]Available from 3M Examples 1–15 show that lithium trifluoromethanesulfonimide is the most effective of the identified antistatic additives in reducing volume resistivity of a transparent polyesterurethane of the kind suitable for use as a coating or as part of a laminate. Volume resistivity is reduced by substantially more than it is reduced by other additives, and by nearly two orders of magnitude over what it would have been without any additive.

The volume resistivities of the polyesterurethane compositions of Examples 1–15 all vary inversely with temperature, thus increasing with decreasing temperature. FIG. 1 is a graph showing the specific dependence of volume resistivity on temperature for the polyesterurethane composition of Example 15.

EXAMPLES 16–21

Preparation of Transparent Polyetherurethanes Incorporating Antistatic Additives A transparent aliphatic polyetherurethane mix, suitable for coating or casting, was prepared from the formulation set forth in Table 3.

TABLE 3

Aliphatic Polyetherurethane Formulation

| Raw Material | Description | Parts (wt.) |
|---|---|---|
| Desmodur W[1] | Bis(4-isocyanato-cyclohexyl)methane | 38.06 |
| Terathane 1000[2] | Polytetramethylene oxide diol | 54.48 |
| Trimethylol propane | Triol | 7.46 |
| Tinuvin 328[3] | UV stabilizer | 0.50 |
| Cyagard 1164[4] | UV stabilizer | 0.50 |

TABLE 3-continued

Aliphatic Polyetherurethane Formulation

| Raw Material | Description | Parts (wt.) |
|---|---|---|
| Irganox 1010[3] | Heat stabilizer | 0.50 |
| Sanduvor 3055[5] | Light stabilizer | 0.50 |

[1] Available from Bayer
[2] Available from DuPont
[3] Available from Ciba Geigy
[4] Available from Cytec
[5] Available from Clariant After a homogeneous solution of the specified polyetherurethane mix was prepared, with the solution temperature at 100° F., 30 ppm dibutyl tin dilaurate catalyst and an antistatic additive were added. Six such solutions were prepared, using the antistatic additives identified in Table 4. The resulting solutions were then cast onto glass or another suitable surface with a transparent conductive coating and cured at 120° F. for 12 hours, followed by 180° F. for 24 hours. The cast films were about 0.025 inches thick. After curing, the volume resistivity of each of the six formulations was measured (at 60° F.) using the method described in ASTM D-257. The additives, their weight percentage, and the resulting resistivity measurements are presented in Table 4.

TABLE 4

Antistatic Additives in Polyetherurethane

| Ex. | Additive | Type | Wt. % | Vol. Res. (ohm-cm) |
|---|---|---|---|---|
| 16 | none | — | 0 | $1.3 \times 10^{13}$ |
| 17 | Cyagard SN[1] | Ammonium salt | 1.0 | $1.0 \times 10^{12}$ |
| 18 | KenStat KSMZ100[2] | Zirconate salt | Not | soluble in polyurethane |
| 19 | Versicon[3] | Polyaniline | 1.0 | $1.3 \times 10^{13}$ |
| 20 | Fluorad FC122[4] | Lithium trifluoromethane sulfonate | 1.0 | $1.9 \times 10^{11}$ |
| 21 | Fluorad HQ115[4] | Lithium trifluoromethanesulfonimide | 1.0 | $1.7 \times 10^{10}$ |

[1] Available from Cytec
[2] Available from Kenrich
[3] Available from Allied Signal
[4] Available from 3M Examples 16–21 show that lithium trifluoromethanesulfonimide not only is the most effective of the identified antistatic additives in reducing volume resistivity of a transparent polyesterurethane, but also of a transparent polyetherurethane. Volume resistivity is reduced by substantially more than it is reduced by other additives, and by well more than two orders of magnitude over what it would have been without any additive.

FIG. 2 is a graph showing the dependence of volume resistivity on temperature for the polyetherurethane compositions of Examples 20 and 21. Also included in FIG. 2 are curves showing the dependence of volume resistivity on temperature for polyetherurethane compositions containing 3% lithium trifluoromethanesulfonate (Fluorad FC122), and 2% and 3% lithium trifluoromethanesulfonimide (Fluorad HQ115). It will be noted that increasing the concentration of lithium trifluoromethanesulfonimide to 2% causes a marked reduction in volume resistivity, but that increasing the concentration further to 3% has little, if any, additional effect. The resistivity/temperature curve for the composition of Example 21 is repeated in FIG. 1, so that the electrical resistivity of polyesterurethane and polyetherurethane, both containing lithium trifluoromethanesulfonimide (Fluorad HQ115), can be readily compared.

EXAMPLES 22–27

Durability Testing of Modified Polyurethanes

It is noted from Tables 2 and 4 that the particular additives that yielded the largest increase in conductivity in the two types of polyurethanes were Fluorad FC122 (lithium trifluoromethanesulfonate) and Fluorad HQ115 (lithium trifluoromethanesulfonimide). In Examples 22–27, mixes of both polyesterurethane and polyetherurethane containing these additives, in weight percentages of both 1% and 3%, were prepared as specified above and then coated onto polycarbonate sheet samples that had been pre-coated with a transparent, conductive coating and primer.

The pre-coated polycarbonate had been prepared using aircraft-grade polycarbonate sheet (MIL-P-83310) with a conventional polysiloxane hard coating. These sheets were first coated with a three-layer indium tin oxide (ITO)/gold/ITO film stack, using a sputtering process, to a sheet resistance of about 15 ohms/square. A silica ($SiO_2$) layer about 30 nanometers in thickness was then deposited over the ITO coating using an evaporation process. Finally, an aminosilane primer was then applied by flow coating using a 0.1% solution of A-1100 primer (Union Carbide) dissolved in isopropanol.

After curing, the coated samples were exposed to 95%–100% relative humidity, at a temperature of 120° F., and light transmission, haze, and adhesion were measured at 500-hour intervals. The samples incorporating 3% additive concentration levels were included to represent worst-case conditions, and to accelerate the rate of processes causing property degradation. The results of these tests are presented in Table 5.

TABLE 5

Humidity Testing of Polyurethane Coatings

| Additive, p-urethane[1] | Exp Time, hrs[2] | % LT[3] | % Haze[3] | Adhesion[4] |
|---|---|---|---|---|
| 1% FC122, p-ester | 0 | 82.5 | 1.5 | 100% |
|  | 500 | 75.3 | >50 | Delaminated |
| 1% HQ115,p-ester | 0 | 83.1 | 1.4 | 100% |
|  | 500 | 83.0 | 1.6 | 100% |
|  | 2000 | 83.0 | 1.6 | 100% |
| 1% FC122, p-ether | 0 | 83.1 | 1.3 | 100% |
|  | 500 | 77.2 | >50 | Delaminated |
| 1% HQ115, p-ether | 0 | 79.7 | 1.2 | 100% |
|  | 500 | 79.3 | 1.6 | 100% |
|  | 2000 | 78.7 | 1.8 | 100% |
| 3% FC122, p-ether | 0 | 83.3 | 1.0 | 100% |
|  | 500 | Opaque | Opaque | Delaminated |
| 3% HQ115, p-ether | 0 | 81.8 | 1.5 | 100% |
|  | 500 | 81.9 | 1.8 | 100% |
|  | 2000 | 81.9 | 1.6 | 100% |

Percent light transmission and percent haze were measured according to ASTM D-1003, and percent adhesion was measured according to ASTM D-3359.

Examples 22–27 show the surprisingly better humidity resistance of transparent polyurethane coatings modified to incorporate lithium trifluoromethanesulfonimide, as compared with the same polyurethanes modified with lithium trifluoromethanesulfonate. In particular, the coatings incorporating lithium trifluoromethanesulfonimide exhibited substantially no degradation in light transmission, percent haze and percent adhesion during the humidity tests. In contrast, the coatings incorporating lithium trifluoromethanesulfonate exhibited substantial degradation in light transmission and percent haze after just 500 hours of the humidity tests, and the coatings all delaminated from their underlying substrates.

EXAMPLES 28–30

Transparent Antistatic Polyetherurethane Bilayer Coatings on ITO-Coated Glass, Polycarbonate, and Acrylic In Example 28, a soda lime glass surface was coated with ITO, silica, and an aminosilane primer, as described above in Examples 22–27. To form a first polyurethane coating for this glass surface, an adhesive solution was prepared from a moisture-curable, aromatic polyetherurethane, thermoset adhesive, based on methylene diphenyl diisocyanate (MDI) and polytetramethylene oxide polyols, in cyclohexanone at 18% concentration. Lithium trifluoromethanesulfonimide (Fluorad HQ115) was then dissolved in the adhesive solution at a concentration of 1% based on the polyurethane, and this adhesive solution was then flow coated onto the ITO/SiO$_2$-coated glass surface and cured at room temperature for 3–4 hours.

To form a second polyurethane coating over the first polyurethane coating, a polyesterurethane solution was prepared as set forth in Table 1, and 1% lithium trifluoromethanesulfonimide (Fluorad HQ115) and 200 ppm dibutyl tin dilaurate catalyst were then added. The resulting solution was then coated over the first polyurethane coating and cured at 100–140° F. for two hours followed by 180° F. for 24 hours. After curing, the resulting bilayer coating system was determined by the method of ASTM D-257 to have a volume resistivity of 3.2×10$^{12}$ ohm-cm.

In Example 29, ITO and SiO$_2$ coatings were applied to the surface of a polysiloxane-coated polycarbonate sheet using the procedure described above in Examples 22–27. A bilayer polyurethane coating using 1% Fluorad HQ115 was then applied to the surface and cured as described in Example 28. The volume resistivity of this bilayer coating system was determined by the method of ASTM D-257 to be 3.1×10$^{12}$ ohm-cm.

In Example 30, a three-layer ITO/gold/ITO stack and a SiO$_2$ coating were applied to a polysiloxane-coated acrylic sheet, using the procedure described in Examples 22–27. The acrylic sheet was aircraft grade per MIL-P-25690. A bilayer polyurethane coating using 1% Fluorad HQ115 was then applied to the surface and cured as described in Example 28. The volume resistivity of this bilayer coating system was determined by the method of ASTM D-257 to be 3.5×10$^{12}$ ohm-cm.

Examples 28–30 show the effectiveness of a bilayer polyurethane coating system using a thermoset adhesive and applied over various transparent substrates.

EXAMPLES 31–32

Transparent Antistatic Polyurethane Bilayer Laminate

In Example 31, a first polyurethane sheet was prepared by forming a solution at 100° F. based on the formulation set forth in Table 6. Added to this solution was 1% Fluorad HQ115, followed by 200 ppm dibutyl tin dilaurate catalyst. The mix was then pumped into a cell formed from two glass sheets and a peripheral gasket, and cured at 180° F. for 24 hours. After separation from the glass, a transparent polyurethane sheet of about 0.040 inches thickness was obtained. The volume resistivity of this cast thermoset sheet was determined by the method of ASTM D-257 to be 4.9×10$^{12}$ ohm-cm.

TABLE 6

Aliphatic Polyesterurethane Formulation

| Raw Material | Description | Parts (wt.) |
| --- | --- | --- |
| Desmodur W[1] | Bis(4-isocyanato-cyclohexyl)methane | 47.0 |
| Tone 301[2] | Polycaprolactone triol | 22.0 |
| Tone 200[2] | Polycaprolactone diol | 30.0 |
| Tinuvin 328[3] | UV stabilizer | 0.5 |
| Irganox 1010[3] | Antioxidant | 0.5 |

[1]Available from Bayer
[2]Available from Union Carbide
[3]Available from Ciba Geigy A second polyurethane sheet was then prepared by dissolving Fluorad HQ115 in isopropanol, at a concentration of 1%, and this solution was then sprayed evenly onto both surfaces of a 0.025-inch thick extruded transparent aliphatic polyetherurethane sheet (PE-399 manufactured by Morton). Sufficient solution was applied to yield a total concentration of 1% Fluorad HQ115 based on the polyurethane sheet. The sheet was air dried for 16 hours, to evaporate all of the solvent. The volume resistivity of this modified sheet was determined by the method of ASTM D-257 to be 1.5×10$^{10}$ ohm-cm.

The first and second polyurethane sheets described above were then laminated to a polycarbonate sheet having a conductive ITO/gold/ITO stack and SiO$_2$ coatings, as described above in Examples 22–27. Specifically, the second polyurethane sheet, i.e., the thermoplastic aliphatic polyetherurethane containing 1% Fluorad HQ115, was used as an adhesive between the polycarbonate sheet and the first polyurethane sheet, i.e., the polyesterurethane sheet. The three sheets were laminated in an autoclave using conventional vacuum bag techniques, at a temperature of 200° F. and pressure of 100 psi. The volume resistivity of this bilayer laminate was determined by the method of ASTM D-257 to be 1.2×10$^{12}$ ohm-cm.

In Example 32, a laminate was prepared as described above in Example 31, except that the first polyurethane sheet was formed of polyetherurethane (PE-399, Morton), with Fluorad HQ115 incorporated into the resin prior to extrusion at a 1% level. The volume resistivity of the resulting extruded sheet was determined by the method of ASTM D-257 to be 1.8×10$^9$ ohm-cm. The second polyurethane sheet and the coated polycarbonate sheet were the same as in Example 32, and the various layers were laminated together in the same manner as was done in Example 32. The volume resistivity of this bilayer laminate was determined by the method of ASTM D-257 to be 1.5×10$^{12}$ ohm-cm.

Examples 31 and 32 show the effectiveness of the polyurethanes of the invention used as bilayer laminates with a thermoplastic adhesive. The examples also show alternate methods of incorporating the preferred antistatic additive into transparent polyurethanes.

It should be appreciated from the foregoing disclosure that the present invention provides an improved polyurethane composition that incorporates a prescribed additive for enhancing electrical conductivity without adversely affecting the composition's transparency and or adhesion to an underlying substrate. The additive enhances the composition's electrical conductivity by at least about two orders of magnitude, making it ideally suited for use as a coating for a transparency, or as part of a laminate, that can avoid shock hazards or damage from a buildup of static charge.

Although the invention has been disclosed with reference only to the presently preferred embodiments, those of ordinary skill in the art will appreciate that various modifications can be made without departing from the invention. Accordingly, the invention is defined only by the following claims.

We claim:

1. A transparent polyurethane composition suitable for coating or casting, wherein the composition consists essentially of polyurethane and an ionizable salt of a perfluoroalkysulfonimide, and wherein the ionizable salt of the perfluoroalkysulfonimide is present in an amount 0.5 to 5.0 weight percent of the total amount of polyurethane and ionizable salt of the perfluoroalkysulfonimide in the composition.

2. A transparent polyurethane composition as defined in claim 1, wherein the composition is an aliphatic polyesterurethane.

3. A transparent polyurethane composition as defined in claim 1, wherein the composition is an aliphatic polyetherurethane.

4. A transparent polyurethane composition as defined in claim 1, wherein the metal is an alkali metal and the perfluoroalkylsulfonimide is trifluoromethanesulfonimide.

5. A transparent polyurethane composition as defined in claim 4, wherein the ionizable salt is lithium trifluoromethanesulfonimide.

6. A transparent polyurethane composition as defined in claim 5, wherein the weight percent of lithium trifluoromethanesulfonimide is in the range of 1.0 to 3.0.

7. A transparent polyurethane composition as defined in claim 1, wherein the ionizable salt is incorporated at a concentration effective to reduce the composition's volume resistivity, after curing, by more than about two orders of magnitude over what it would be in the absence of the ionizable salt.

* * * * *